United States Patent
Fukui et al.

(10) Patent No.: US 6,718,616 B2
(45) Date of Patent: Apr. 13, 2004

(54) METHOD OF PRODUCING LAMINATED IRON CORES

(75) Inventors: Atsushi Fukui, Fukuoka (JP); Minao Isayama, Fukuoka (JP)

(73) Assignee: Mitsui High-Tec, Inc. (JP)

( * ) Notice: Subject to any disclaimer, the term of this patent is extended or adjusted under 35 U.S.C. 154(b) by 100 days.

(21) Appl. No.: 10/031,510

(22) PCT Filed: May 17, 2001

(86) PCT No.: PCT/JP01/04127
§ 371 (c)(1),
(2), (4) Date: Jan. 16, 2002

(87) PCT Pub. No.: WO01/89065
PCT Pub. Date: Nov. 22, 2001

(65) Prior Publication Data
US 2002/0114824 A1 Aug. 22, 2002

(30) Foreign Application Priority Data
May 18, 2000 (JP) ........................................ 2000-145919

(51) Int. Cl.⁷ ........................ H02K 15/00; H02K 15/14; H02K 15/16
(52) U.S. Cl. ........................ 29/596; 29/564.1; 29/598; 29/609; 83/40; 415/139
(58) Field of Search .............................. 29/596, 564.1, 29/564.6, 598, 609; 83/40, 41, 49, 50; 310/323.04; 415/139

(56) References Cited

U.S. PATENT DOCUMENTS 5,044,237 A * 9/1991 Frame ........................... 83/41
5,636,432 A * 6/1997 Usher et al. ................... 29/596
5,915,750 A * 6/1999 Usher et al. ................... 29/596

FOREIGN PATENT DOCUMENTS

| JP | 52120306 | 10/1977 | |
| JP | 52138602 | 11/1977 | |
| JP | 574177 | 1/1982 | |
| JP | 1190235 | 7/1989 | |
| JP | 6141492 | 5/1994 | |
| JP | 6343248 | 12/1994 | |
| JP | 06-343248 | * 12/1994 | .......... H02K/15/02 |
| JP | 6351196 | 12/1994 | |
| JP | 77895 | 1/1995 | |
| JP | 07-007895 | * 1/1995 | .......... H02K/15/02 |
| JP | 7256343 | 10/1995 | |
| JP | 8149761 | 6/1996 | |
| JP | 08-149761 | * 6/1996 | .......... H02K/15/02 |
| JP | 200050579 | 2/2000 | |
| JP | 2000113897 | 4/2000 | |

* cited by examiner

*Primary Examiner*—A. Dexter Tugbang
*Assistant Examiner*—Tim Phan
(74) *Attorney, Agent, or Firm*—Wood, Phillips, Katz, Clark & Mortimer

(57) ABSTRACT

A method of producing a laminated iron core by punching and laminating rotor and stator core pieces. The rotor core pieces are punched from a metal sheet and laminated. Magnetic pole teeth are roughly punched in the metal sheet with the rotor core pieces removed. Each of a plurality of magnetic pole teeth are pressed at plural different portions to form thin parts so as to develop the plurality of magnetic pole teeth toward the punched side of the rotor core piece. Thereafter, the stator core piece is punched to form front tips on the magnetic pole teeth defining an internal form on the stator core piece. An external form of the stator core piece is punched. The punched stator core pieces are laminated in succession.

7 Claims, 3 Drawing Sheets

METHOD OF PRODUCING LAMINATED IRON CORES

CROSS REFERENCE TO RELATED DOCUMENT

This application is a 371 of PCT/JP01/04127, filed May 17th 2001, which claims the benefit of Japanese Patent Application No. 2000/145919, filed May 18th 2000.

TECHNICAL FIELD

The present invention relates to a method of producing a laminated iron core.

TECHNICAL BACKGROUND

An electric motor is incorporated with a laminated iron core. The laminated iron core comprises a rotor core and a stator core, and both iron cores are composed by laminating iron core pieces punched from metal sheets.

If rotor core pieces and stator core pieces are coaxially punched from the same metal sheets, a producing yield is far heightened, and a space of installing a progressive die means assembly apparatus can be largely reduced. But when punching the rotor core pieces, followed by punching stator core pieces, oral so when punching the stator core pieces, followed by punching the rotor core pieces, difference between external forms of the rotor core pieces and internal forms of the stator core pieces, that is, a gap therebetween is generally narrow, and a problem is present as follows. For example, when punching the external forms of the rotor core pieces, followed by punching the internal forms of the stator core pieces, punched scraps are narrow in width and broken during punching or turned up as floating, and scraps do not drop downward a die and must be twice punched, or scraps are scratched to hurt a progressive die means assembly.

From the viewpoint of heightening rotating precision, it is especially important that the space between the external form of the rotor core and the internal form of the stator core is made small as a stepping motor, namely, that an air gap therebetween is made, e.g., 20 μm or less, but a problem is that the rotor core piece and the stator core piece cannot be punched from the same metal sheet.

As methods of producing laminated iron cores for solving the above problems, an applicant of this invention has proposed JP-A-6-343248, JP-A-6-351196 and JP-A-7-7895. The essentials common among these inventions are present in punching the rotor core pieces from metal sheets and laminating them, roughly punching magnetic pole teeth of the stator core pieces from said metal sheets coaxially with said rotor core pieces, pressing some portions of said magnetic pole teeth to make thickness locally reduced for causing the reduced portions to develop toward the punched side of the rotor core piece, subsequently punching to form small teeth at front tips of the magnetic pole teeth and side faces thereof, punching the external forms of the stator core pieces, and laminating them.

According to them, some portions of the magnetic pole teeth of the roughly punched stator core pieces are urged in the thickness direction to reduce the thickness thereof, and front tips of the magnetic pole teeth develop toward the punching side of the rotor core piece so as to expand a punching margin of the internal side of the stator core piece. Accordingly, when punching out small teeth of the magnetic pole teeth becoming edges of the internal forms of the stator core pieces, the width of scraps is widened and neither broken nor turned up as floating during punching operation. Thus, it is possible to punch and form the rotor core pieces and the stator core pieces from the same metal sheet, thereby to effectively increase the producing yield.

DISCLOSURE OF THE INVENTION

An inventor made further experiments and studies, and found problems involved with techniques. The abovementioned methods comprise punching out the rotor core pieces from metal sheets, roughly punching the magnetic pole teeth of the stator core pieces, and pressing some portions of them to be reduced for developing toward the space sides by previously punching, but difficult is to steadily secure a developing amount or to make an optimum amount. In addition, another problem is that ruggedness formed on a surface of the metal sheet by pressing causes disturbances in a flow of a magnetic flux.

This invention has been realized in view of the above mentioned circumstances, and it is an object of the invention to offer a method of enabling to steadily obtain gaps of high precision for reducing gaps between a rotor and a stator by punching rotor core pieces from metal sheets, roughly punching magnetic pole teeth of stator core pieces, and pressing some portions of them to be reduced.

It is another object of the invention to obtain laminated iron cores having excellent characteristics, in which the magnetic pole teeth of the roughly punched stator core pieces develop toward the space sides made by previously punching the rotor core pieces or make developing of an optimum amount to sufficiently secure the punching margins for pressing the front tips of the magnetic pole teeth becoming the internal forms of the stator core pieces, and the punching can be performed without obstacles even if gaps with the rotor core pieces are small, and further ruggedness formed on a surface of the metal sheet by pressing does not cause disturbances in a flow of magnetic flux.

The essential point of the invention is present in a method of producing a laminated iron core by punching and laminating the stator core pieces and the rotor core pieces, characterized by punching the rotor core pieces from metal sheets and laminating them, roughly punching the magnetic pole teeth of the stator core pieces from said metal sheets already punched of the rotor pieces, changing positions of the magnetic pole teeth and pressing on a plurality of parts thereof and developing them toward the punched sides of the rotor core pieces, subsequently punching to form the front tips of the magnetic pole teeth composing edge parts of the internal forms of the stator core pieces, and punching the external forms of the stator core pieces and laminating them.

Desirably, the pressing on the plurality of parts by changing the positions in the magnetic pole teeth is characterized in that said pressing is carried out by changing pressing timings.

As to another essential point, the pressing effected on the plurality of parts by changing the positions in the magnetic pole teeth is characterized by taking partial charge of slight reduction of thickness in taking partial charge of development toward the punched side of the rotor core piece.

Other characteristics and merits of the invention will be apparent from explanation for embodiments of the invention.

Figure 1:
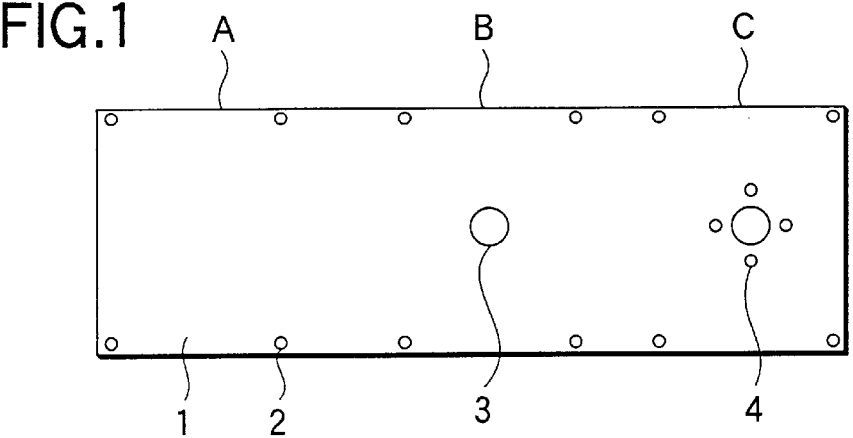
FIG. 1 is a view showing a preceding procedure of punching the iron core pieces to be laminated in a first embodiment of the invention.
Figure 2:
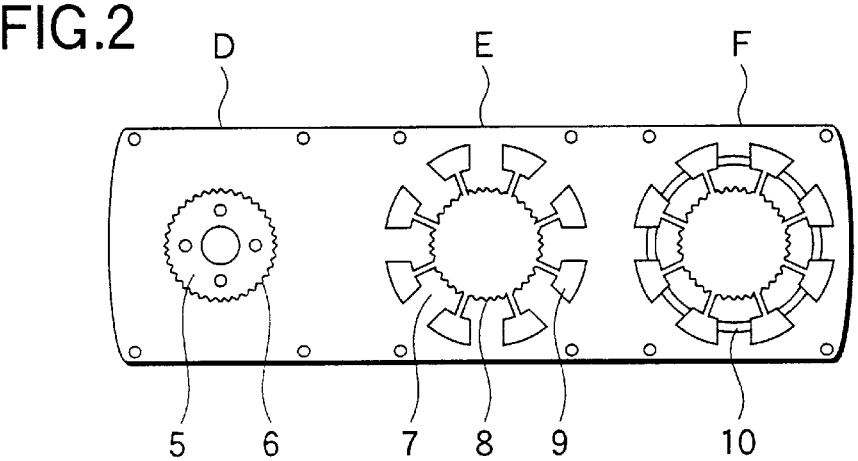
FIG. 2 is a view showing a middle procedure of punching the iron core pieces to be laminated in the first embodiment of the same.
Figure 3:
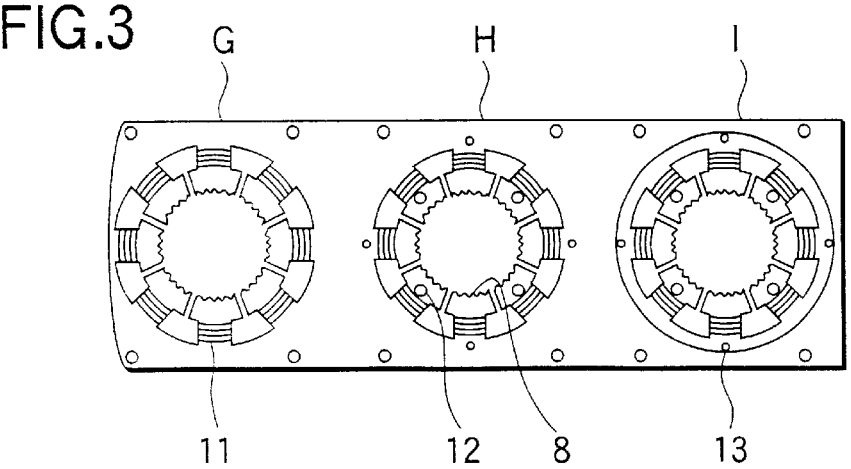
FIG. 3 is a view showing a latter procedure of punching the iron core pieces to be laminated in the first embodiment thereof.
Figure 4:
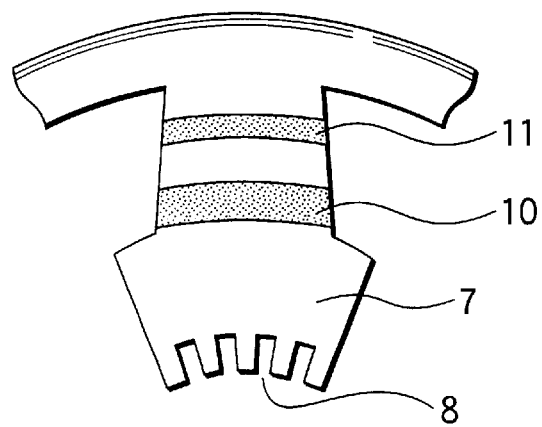
FIG. 4 is a partially enlarged plan view of pressing on the magnetic pole teeth of the stator core pieces in the first embodiment.

In the drawings, reference numeral 1 designates a metal sheet, 2 shows a guide hole, 3 is a shaft hole, 4 is an interlocking part, 5 is the rotor core piece, 6 is teeth, 7 is the magnetic pole teeth, 8 is a small teeth, 9 is a slot, 10 is a thin thickness part, 11 is a second thin thickness part, 12 is a interlocking part, 13 is a stator core piece, 14 is the laminated core of the stator, and 15 is the laminated core of the rotor.

MOST PREFERRED EMBODIMENT OF THE INVENTION

Explanation will be specifically made to modes for carrying out the invention, referring to the attached drawings.

A first embodiment of the invention will be stated in detail.

A method according to the invention is characterized by pressing such as coining several times on a plurality of parts of the metal sheet punched of the rotor core pieces. That is, as shown in FIGS. 1 to 5, the method is characterized by comprising: the rotor core piece-punching step of punching the rotor core piece 5 from the metal sheet 1 and laminating in succession the punched rotor core pieces 5; the magnetic pole teeth-punching step of roughly punching the magnetic pole teeth 7 of the stator core piece 13 from the metal sheet punched of the rotor core piece 5; the pressing step of carrying out the pressing on the plural parts of the magnetic pole teeth 7 and developing the magnetic pole teeth 7 toward the punched side of the rotor core piece 5; and subsequently the stator core piece-punching step of punching to form front tips of the magnetic pole teeth composing an internal form of the stator core piece 13, punching an external form of the stator core piece 13, and laminating in succession the punched stator core pieces 13.

The metal sheet 1 is, for example, a silicon steel sheet, a low carbon steel sheet or the like, and from the metal sheet 1, the rotor core piece and the stator core piece are successively punched out.

Herein, in a station A, guide holes 2 are punched out. In a station B, a shaft hole 3 of the rotor core piece is punched out.

In a station C, four interlocking parts 4 of the rotor core piece are formed around to surround the shaft hole 3. The interlocking part 4 is a penetrating hole of or punched in a penetrated grooved in the rotor core piece of a first sheet of the laminated layer, and the rotor core pieces of from a second sheet to predetermined laminated sheets are half-punched holes of or punched in half-punched grooves. Parts projected by said half-punching are fitted in the penetrated hole of or in the penetrated groove in said rotor core piece, or in the half punched concave hole of said rotor core piece. The penetrated hole or the penetrated groove as well as the half-punched hole or the half-punched groove are formed in a manner of the depth of a punch (not shown) going in a die side is switched by a known switching instrument. Shapes of the interlocking part 4 may depend on adoption of any optional circle, square, V, groove and others.

In a station D, the rotor core piece 5 is punched out, and immediately under the station D, a laminating part is installed and the laminations by interlocking are piled via the interlocking part 4 per each of successive punchings. The rotor core piece 5 is formed with many teeth 6 on the outer circumference in this embodiment to enable precise stepping rotation at small rotating angles. The lamination of the rotor core pieces 5 may depend on adoption of direct lamination, circular lamination or skew lamination. In this embodiment, the rotor core piece 5 is formed with the teeth 6 on the outer circumference, and the rotor core piece without teeth may be applied.

The metal sheet after punching and laminating the rotor core pieces 5 is guided to a station E, in which the magnetic pole teeth 7 of the laminated iron core pieces are roughly punched to be coaxial with the rotor core pieces 5 by punching slots 9. The magnetic pole teeth 7 are formed at front tips with teeth to be small teeth 8, and the slots 9 are formed between adjacent magnetic pole teeth 7.

Between the internal form of the front tips of the magnetic pole teeth 7 of the stator core piece and the external form of the rotor core piece 5 is an air gap of the laminated iron core. The narrower the air gap, the stronger a stationary toque, and the positioning precision of rotation is excellent. When the rotor core piece 5 and the stator core piece are punched coaxially from the same metal sheet, if punching the internal form of the stator core piece after punching the rotor core piece 5, since punching margins are small, the punching of the stator core piece with the narrow air gap is difficult in the prior art. Therefore, some portions of the magnetic pole teeth 7 of the roughly punched stator core piece are pressed and caused to develop toward the space side of punching the rotor core 5. However, the prior art has a problem that enough developing amounts by pressing the magnetic pole teeth 7 are not always stably obtained, and if the developing amount is made large, the concave in the sheet surface by pressing is made large to disarrange the flow of the magnetic flux.

On the other hand, the invention changes positions of pressing the magnetic pole teeth 7, changes timing of pressing, divides the pressing positions into plural portions for enough securing the developing amounts, and makes a concave small per one position.

That is, in a station F, interiors of the magnetic pole teeth 7 and coaxial with the rotor core 5 are pressed by a punch (not shown) to reduce the thickness and develop toward the punched side of the rotor core piece 5. Thus, a first thin part 10 is formed.

Figure 5:
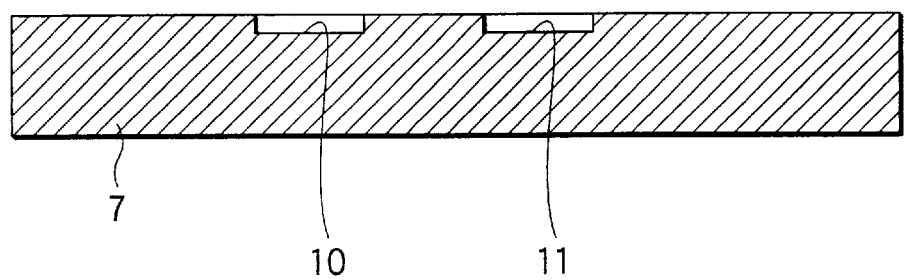
FIG. 5 is a partially enlarged plan view of pressing on the magnetic pole teeth of the stator core pieces in the first embodiment.

In a station G, the pressing position of the magnetic pole teeth 7 is shifted to the outside than the first thin part and pressed coaxially with the rotor core piece 5 so as to form a second thin part 11, and further developed toward the punching side of the rotor core piece. The second thin part formed by the second pressing and the first thin part formed by the first pressing take partial charge of developments so as to obtain desired punching margins. The shares are not necessarily equal, but, for example, if the second pressing is the width narrow part of the magnetic pole teeth 7, the share may be changed such that the thickness of the second thin part is smaller than that of the first thin part. In this embodiment, the pressings are carried out in the two stations F and G, and may be done in three stations or more. The pressings are done in the plural stations, that is, done by changing timings and positions, so that it is possible to steadily secure the developments of the magnetic pole teeth 7 of the roughly punched stator core piece toward the punched side of the rotor core piece 5. Further, reduction of the thickness per one pressing is, as seen in FIG. 5, divided and can be lessened, thereby enabling to produce the laminated iron core having a highly precise and stable air gap, and further ruggedness formed on a surface of the metal sheet by pressing does not cause disturbances in a flow of a magnetic flux, and thereby enabling to offer the laminated iron core of high reliability.

The first and second thin parts are preferably formed on the full circumference excepting the slot part of the stator core piece, whereby the air gap of high precision and less strain can be formed.

Figure 8:
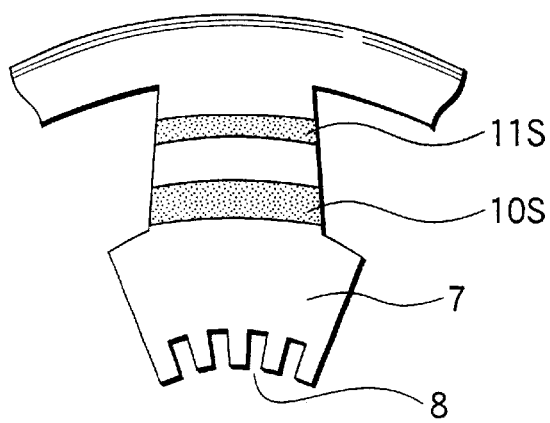
FIG. 8 is a partially enlarged plan view of pressing on the magnetic pole teeth of the stator core pieces in a modified example of the first embodiment.
Figure 9:
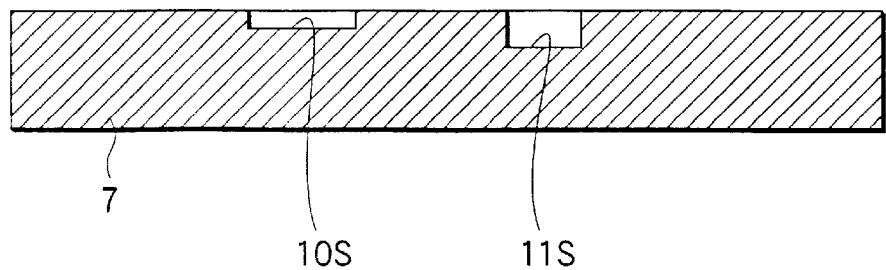
FIG. 9 is a partially enlarged plan view of pressing on the magnetic pole teeth of the stator core pieces in the modified example of the first embodiment.

As a modified example of the above mentioned example, as shown in FIGS. 8 and 9, the partial charges may be changed such that a second thin part 11s is larger in thickness and smaller in width than a first thin part 10s. If strongly pressing the inner diameter of the stator core piece, the development is easy at low force.

Further, as shown in FIGS. 10 and 11, a plurality of thin parts 20 may be formed like dots When forming like dots, the thin parts may be realized by once coining process as controlling strain at good workability.

The timing of coining may be divided into plural times.

In a station H, the front tips of the magnetic pole teeth 7 of the stator core piece secured with the punching margins are punched to form small teeth 8, whereby the stator core piece is formed with an edge of the internal form. In this station H, the interlocking parts 12 of the stator core piece are also formed. The interlocking part 12 is formed as a penetrating hole of or as a penetrated groove in the stator core piece 13 of a first laminated sheet similarly to the rotor core piece 5, and half-punched holes or half-punched grooves are formed from a second sheet to predetermined laminated sheets. Shapes of the interlocking part 12 may depend on adoption of any optional circle, square, V, groove and others, and may be formed in other stations.

Figure 7:
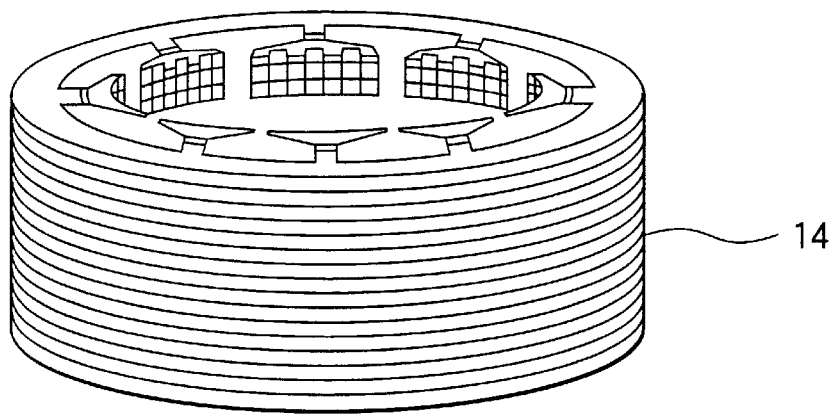
FIG. 7 is a view showing a laminated iron core of the stator produced in the first embodiment.

In a station I, the stator core pieces 13 are punched into external forms and laminated via the interlocking part 12, and a stator laminated core 14 is produced as shown in FIG. 7 by direct lamination or circular lamination.

Figure 6:
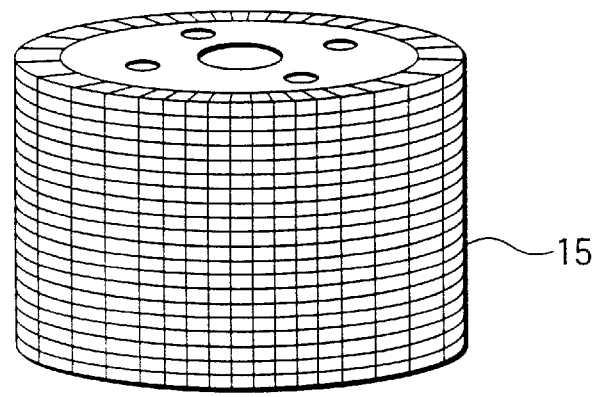
FIG. 6 is a view showing a laminated iron core of the rotor produced in the first embodiment.

On the laminated stator core 14, a coil is wound independently, and in the internal form thereof, the laminated rotor core 15 shown in FIG. 6 is inserted.

As mentioned above, after punching the rotor core pieces, the coining is carried out, followed by punching the inner diameter of the stator core pieces, a width becoming a punched remainder can be made larger, and the remainder can be prevented from turning up as floating. If punching the inner diameter of the stator core piece without coining, the width as the punched remainder is small to make inconvenience of easily causing the remainder to turn up as floating.

Industrial Applicability

The invention comprises punching the rotor core pieces from metal sheets and laminating them, roughly punching the magnetic pole teeth of the stator core pieces from said metal sheets punched of the rotor pieces, pressing the magnetic pole teeth on a plurality of parts thereof by changing positions coaxially with the rotor core piece, developing them toward the punched and space sides of the rotor core pieces so as to steadily form punching margins, and therefore, if the air gap between the outer form of the rotor core piece and the inner form of the stator core piece is narrow, for example, even if being for the stepping motor, the scrap punched in the inner diameter of the stator core piece can be widened, and the punching can be performed without breakage at the middle part of the scrap, turning up as floating or twice punching.

The plural parts of the metal sheet are pressed by changing the magnetic pole teeth as to the position and the timing, and so the pressing per one position is enough with small pushing so that the sheet surface is slightly concave, and a good laminated iron core is obtained with excellent characteristics and without disturbing the flow of the magnetic flux.

The invention is not limited to the above mentioned embodiments.

What is claimed is:

1. A method of producing a laminated iron core by punching and laminating stator core pieces and rotor core pieces, comprising:

a rotor core piece-punching step of punching the rotor core piece from a metal sheet and laminating in succession the punched rotor core pieces;

a magnetic pole teeth-punching step of roughly punching magnetic pole teeth of the stator core piece from the metal sheet punched of the rotor core piece;

a pressing step of pressing each of a plurality of the magnetic pole teeth on plural different portions to form thin parts at the plural different portions on each of the plurality of magnetic pole teeth and developing the plurality of magnetic pole teeth toward the punched side of the rotor core piece; and subsequently the stator core piece-punching step of punching to form front tips of the magnetic pole teeth composing an internal form of the stator core piece, punching an external form of the stator core piece, and laminating in succession the punched stator core pieces.

2. The method of producing laminated iron core as claimed in claim 1, wherein said plural different portions are positioned such that distances from the center of the rotor core pieces are varied.

3. The method of producing laminated iron core as claimed in claim 2, wherein said plural different portions are formed respectively at positions composing concentric circles.

4. A method of producing a laminated iron core by punching and laminating stator core pieces and rotor core pieces, comprising:

a rotor core piece-punching step of punching the rotor core piece from a metal sheet and laminating in succession the punched rotor core pieces;

a magnetic pole teeth-punching step of roughly punching magnetic pole teeth of the stator core piece from the metal sheet punched of the rotor core piece;

a pressing step of carrying out pressings on plural parts of the magnetic pole teeth and developing the magnetic pole teeth toward the punched side of the rotor core piece; and subsequently the stator core piece-punching step of punching to form front tips of the magnetic pole teeth composing an internal form of the stator core piece, punching an external form of the stator core piece, and laminating in succession the punched stator core pieces, wherein said plural parts are positioned such that distances from the center of the rotor core pieces are varied, wherein said plural parts are composed of first thin parts formed over the full circumference in the positions composing the concentric circles and second thin parts formed at outer circumferential sides than the first thin part.

5. The method of producing laminated iron core as set forth in claim 4, wherein said first thin part is smaller in thickness and larger in width than the second thin part.

6. The method of producing laminated iron core as set forth in claim 1, wherein pressing step changes pressing timings of several times.

7. A method of producing laminated iron core by punching and laminating stator core pieces and rotor core pieces, comprising:

a rotor core piece-punching step of punching the rotor core piece from a metal sheet and laminating in succession the punched rotor core pieces;

a magnetic pole teeth-punching step of roughly punching magnetic pole teeth of the stator core piece from the metal sheet punched of the rotor core pieces;

a pressing step of carrying out pressings on plural parts of the magnetic pole teeth and developing the magnetic pole teeth toward the punched side of the rotor core piece; and subsequently the stator core piece-punching step of punching to form front tips of the magnetic pole teeth composing an internal form of the stator core piece, punching an external form of the stator core piece, and laminating in succession the punched stator core pieces, wherein pressing step changes pressing timings of several times, wherein said pressing steps of several times take partial charge of the amount of developing toward the punched side of the rotor core piece, and a total of the developing amount of each time is an amount previously determined.

* * * * *